US012075371B2

(12) United States Patent
Sha et al.

(10) Patent No.: US 12,075,371 B2
(45) Date of Patent: Aug. 27, 2024

(54) METHOD AND APPARATUS FOR DATA TRANSMISSION ON COMMON RESOURCES

(71) Applicant: ZTE CORPORATION, Guangdong (CN)

(72) Inventors: Xiubin Sha, Guangdong (CN); Bo Dai, Guangdong (CN); Ting Lu, Guangdong (CN); Kun Liu, Guangdong (CN); Xu Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 857 days.

(21) Appl. No.: 17/170,485

(22) Filed: Feb. 8, 2021

(65) Prior Publication Data

US 2021/0168739 A1    Jun. 3, 2021

Related U.S. Application Data

(63) Continuation of application No. PCT/CN2018/099685, filed on Aug. 9, 2018.

(51) Int. Cl.
*H04W 56/00* (2009.01)
*H04W 92/18* (2009.01)

(52) U.S. Cl.
CPC .......... *H04W 56/001* (2013.01); *H04W 92/18* (2013.01)

(58) Field of Classification Search
CPC ..... H04W 76/14; H04W 72/04; H04W 76/27; H04W 72/23; H04W 92/18; H04W 48/02; H04W 72/56; H04W 88/08; H04W 88/02; H04W 76/50; H04W 76/18; H04W 76/19; H04W 72/1268; H04B 17/327; H04B 7/0695; H04B 7/063
See application file for complete search history.

(56) References Cited

U.S. PATENT DOCUMENTS

| | | | |
|---|---|---|---|
| 10,149,228 B2 * | 12/2018 | Tsuboi | H04W 72/23 |
| 10,314,072 B2 * | 6/2019 | Loehr | H04W 72/21 |
| 10,367,677 B2 * | 7/2019 | Parkvall | H04W 24/10 |

(Continued)

FOREIGN PATENT DOCUMENTS

| | | |
|---|---|---|
| CN | 101999248 A | 3/2011 |
| CN | 102217407 A | 10/2011 |

(Continued)

*Primary Examiner* — Jung Liu
(74) *Attorney, Agent, or Firm* — Duane Morris LLP

(57) ABSTRACT

A method and apparatus for synchronization in sidelink communications is disclosed. In one embodiment, a method for performing sidelink communications, the method includes: receiving a first message by the wireless communication device from a wireless communication node, wherein the first message comprises configuration information of at least one common resource; transmitting a second message to the wireless communication node on the at least one common resource and starting a first timer, wherein the second message comprises a first identification of the wireless communication device; after the transmitting, monitoring a common physical control channel corresponding to the second message; and receiving a third message on the common physical control channel from the wireless communication node on the at least one common resource before an expiration of the first timer.

20 Claims, 9 Drawing Sheets

(56) References Cited

U.S. PATENT DOCUMENTS

| | | | |
|---|---|---|---|
| 10,448,300 B2* | 10/2019 | Mochizuki | H04W 76/15 |
| 10,595,167 B2* | 3/2020 | Chen | H04W 4/50 |
| 11,382,061 B2* | 7/2022 | Kim | H04W 76/15 |
| 2017/0013640 A1* | 1/2017 | Loehr | H04W 72/21 |
| 2017/0118693 A1* | 4/2017 | Tsuboi | H04W 76/14 |
| 2017/0231029 A1* | 8/2017 | Pelletier | H04W 76/27 |
| 2018/0206080 A1* | 7/2018 | Chen | H04W 76/40 |
| 2020/0137821 A1* | 4/2020 | Cirik | H04W 76/19 |
| 2020/0245184 A1* | 7/2020 | Jin | H04L 69/22 |

FOREIGN PATENT DOCUMENTS

| | | |
|---|---|---|
| CN | 102413484 A | 4/2012 |
| CN | 103098496 A | 5/2013 |
| CN | 105325029 A | 2/2016 |
| WO | 2009046061 A2 | 4/2009 |

* cited by examiner

METHOD AND APPARATUS FOR DATA TRANSMISSION ON COMMON RESOURCES

TECHNICAL FIELD

This disclosure relates generally to wireless communications and, more particularly, to a method and apparatus for data transmission on common resources.

BACKGROUND

Machine-to-Machine (M2M) Communication is currently an important area for research in fifth generation mobile communication technologies (5G), and is an important field for application for the future of wireless communications. Within the scope of M2M communication, Narrowband IoT (NB-IoT) is a new, fast emerging wireless technology which can enable a wide range of new devices and is capable of efficiently connecting a large number of devices, while minimizing power consumption and increasing coverage range in locations that are not served by conventional wireless communication technologies.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In NB-IoT applications, the amount of data transmitted between devices (i.e., user terminals) is substantially less than traditional wireless communications. A power consumption of an user terminal during infrequent small data packet transmissions become significantly less than those in the traditional wireless communications. Because of the reduced power consumption during actual data transmission, the power consumption, on the other hand, during the establishment of a connection, becomes significant. For example, the time used for data transmission and channel monitoring under a Radio Resource Control (RRC) connection state is comparable to the time used for the establishment of the RRC connection, e.g., a Physical Random Access Channel (PRACH) procedure. Further, a mechanism, known as Early Data Transmission (EDT), for data transmission during the PRACH procedure is specified for the NB-IoT applications, in which battery life can be improved and message latency can be reduced. Under this mechanism, the user terminal with small data packet transmissions is not required to be in the RRC connection state, in which the power consumption during the PRACH procedure becomes further dominant.

Currently, a PRACH procedure without an EDT mechanism requires at least 4 steps through which a contention resolution is considered successful before a user-specific data transmission can be performed. Similarly, a PRACH procedure with an EDT mechanism still requires a similar 4-step process through which a small data packet transmission can be performed during the PRACH procedure and then a contention resolution is then considered successful. Thus, there exists a need to reduce steps in the PRACH procedure so that a contention resolution can be completed during early steps to further reduce the power consumption and improve the transmission efficiency during a PRACH procedure.

In one embodiment, a method performed by a wireless communication device, includes: receiving a first message by the wireless communication device from a wireless communication node, wherein the first message comprises configuration information of at least one common resource; transmitting a second message to the wireless communication node on the at least one common resource and starting a first timer, wherein the second message comprises a first identification of the wireless communication device; after the transmitting, monitoring a common physical control channel corresponding to the second message; and receiving a third message on the common physical control channel from the wireless communication node on the at least one common resource before an expiration of the first timer.

In a further embodiment, a method performed by a wireless communication node, includes: transmitting a first message to a wireless communication device, wherein the first message comprises configuration information of at least one common resource; receiving a second message from the wireless communication device on the at least one common resource, wherein the second message comprises a first identification of the wireless communication device; and transmitting a third message on a common physical control channel to the wireless communication device on the at least one common resource before an expiration of a first timer.

In another embodiment, a computing device includes at least one processor and a memory coupled to the processor, the at least one processor configured to carry out the method.

Yet, in another embodiment, a non-transitory computer-readable medium has stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
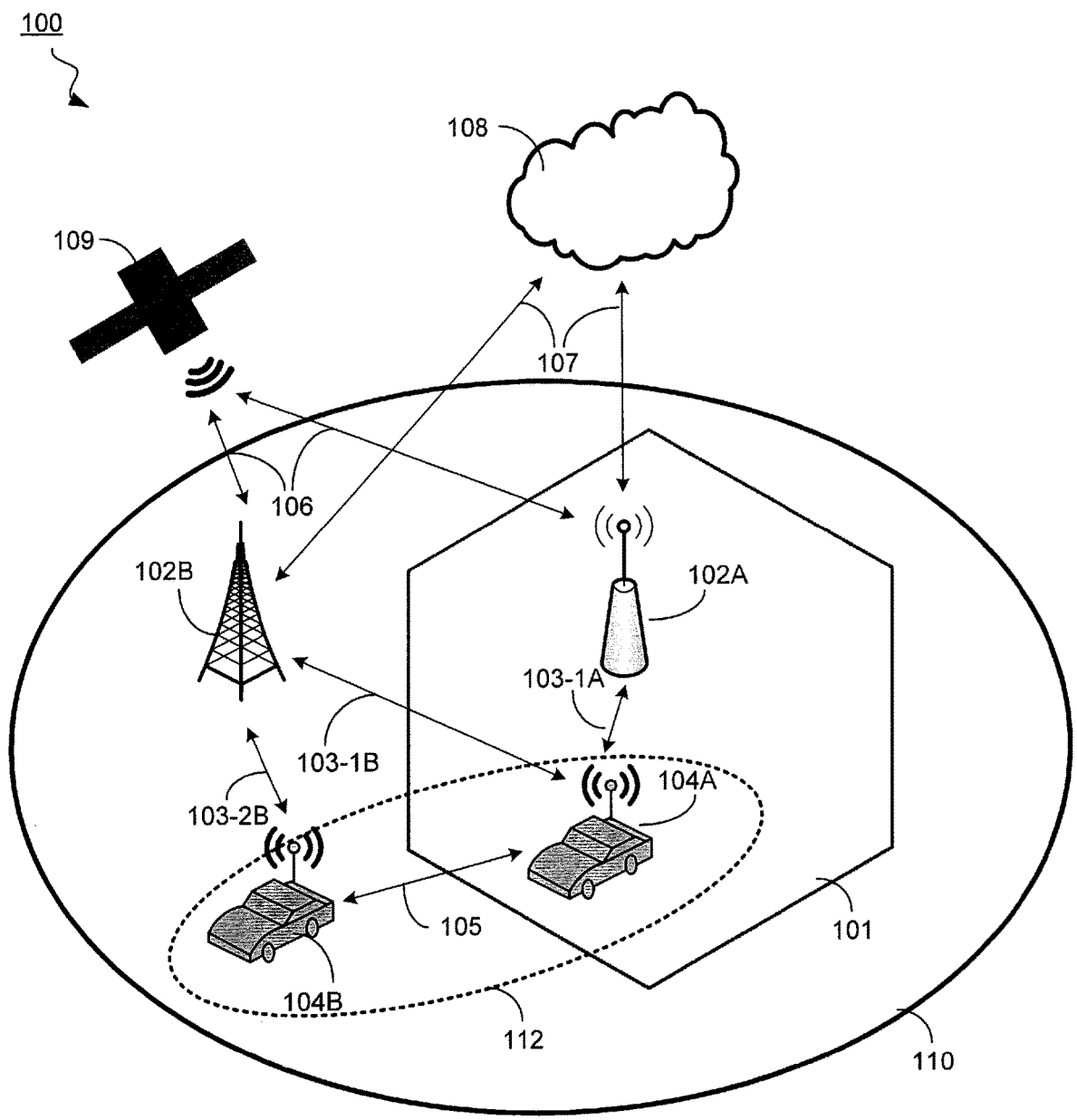
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a gNodeB (also known as gNB) in new radio (NR) technology, a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, and in all the embodiments in this disclosure hereafter, and are generally referred to as "communication nodes" herein. Such communication nodes may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a first BS 102A (e.g., gNB), a second BS 102B (e.g., eNB), a first UE 104A (e.g., NR-UE), and a second UE 104B (e.g., LTE-UE). The UE 104A each can be a vehicle that is moving in a first cell 101 covered by the BS 102A and a second cell 110 covered by the BS 102B. In some embodiments, the first cell 101 is in the second cell 110. In some embodiments, the UE 104A has direct communication channels 103-1A and 103-1B with the BS 102A as well as the BS 102B, respectively. Similarly, the UE 104B can be also a vehicle that is moving in the same cell 110 covered by the BS 102B, but may not have a direct communication channel with the BS 102A or is out of coverage of the cell 101. Although the UE 104b does not have a direct communication channel with the BS 102A, it forms a direct communication channel 105 with its neighbor UEs, e.g., UE 104A within a sidelink (SL) communication group 112. The direct communication channels between the UE 104 and the BS 102 can be through interfaces such as an Uu interface, which is also known as UMTS (Universal Mobile Telecommunication System (UMTS) air interface. The direct communication channels 105 between the UEs can be through a PC5 interface, which is introduced to address high moving speed and high density applications such as Vehicle-to-everything (V2X) and Vehicle-to-Vehicle (V2V) communications. The BS 102 is connected to a core network (CN) 108 through an external interface 107, e.g., an Iu interface.

The UE 104A obtains its synchronization reference from the corresponding BS 102A, which obtains its own synchronization reference from the core network 108 through an internet time service, such as a common time NTP (Network Time Protocol) server or a RNC (Radio Frequency Simulation System Network Controller) server. This is known as network-based synchronization. Alternatively, the BS 102A can also obtain synchronization reference from a Global Navigation Satellite System (GNSS) 109 through a satellite signal 106, especially for a large BS in a large cell which has a direct line of sight to the sky, which is known as satellite-based synchronization. The main advantage of the satellite-based synchronization is full independency providing a reliable synchronization signal as long as the station remains locked to a minimum number of GPS (Global Positioning System) satellites. Each GPS satellite contains multiple atomic clocks that contribute very precise time data to the GPS signals. GPS receivers on the BS 102A decode these signals, effectively synchronizing the corresponding BS 102A to the atomic clocks. This enables corresponding BS 102A to determine the time within 100 billionths of a second (i.e., 100 nanoseconds), without the cost of owning and operating atomic clocks.

Similarly, the UE 104B can obtain a synchronization reference from the corresponding BS 102B which further obtains its own synchronization reference from the core network 108 or from a GNSS 109, as discussed in detail above. The UEs 104A can also obtain a synchronization reference through the UE 104B in sidelink communications, wherein the synchronization reference of the UE 104B can be either network-based or satellite-based, as described above.

Figure 1B:
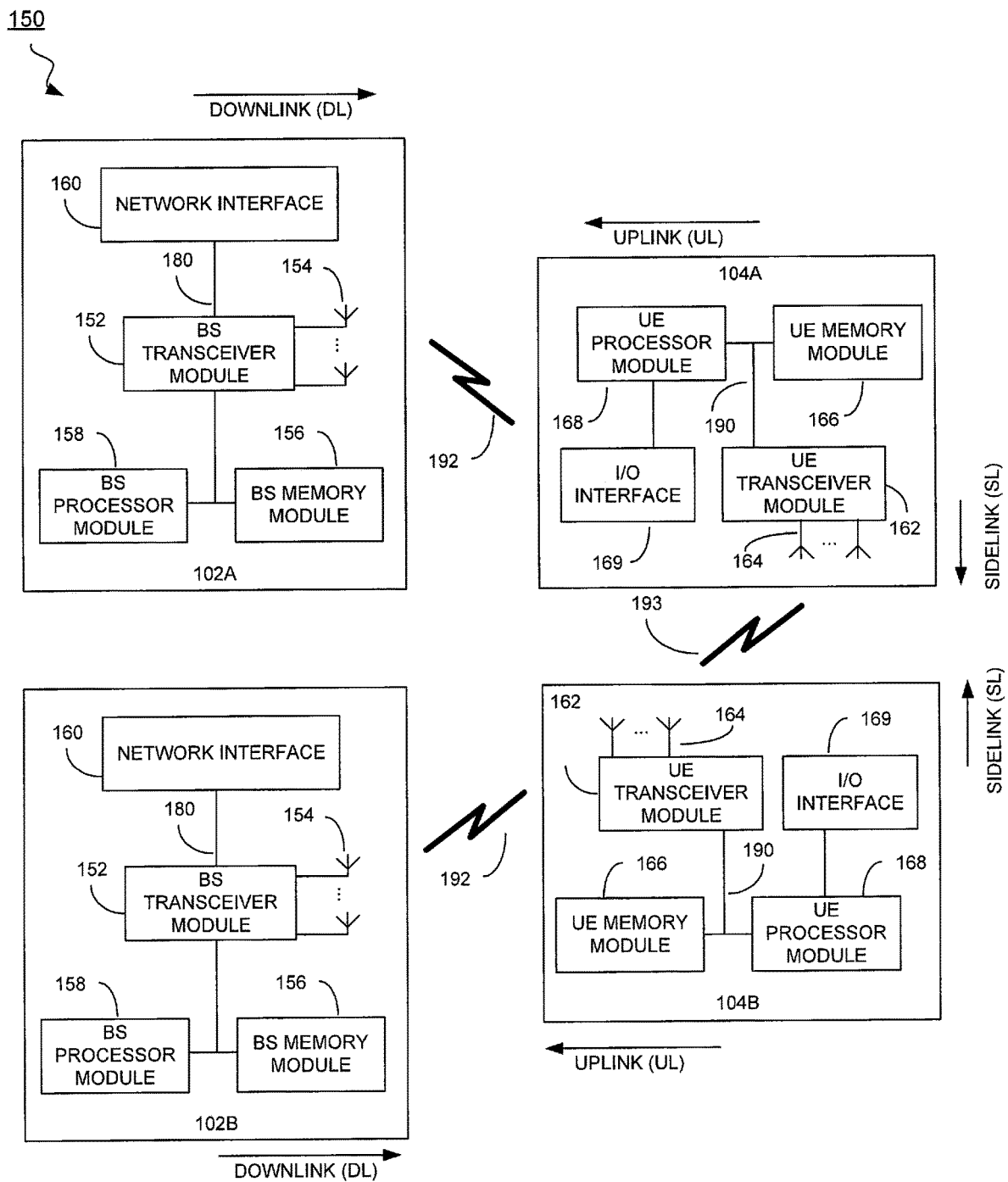
FIG. 1B illustrates a block diagram of an exemplary wireless communication system for transmitting and receiving downlink and downlink communication signals, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a first BS 102A, a second 102B, a first UE 104A and a second UE 104B, collectively referred to as BS 102 and UE 104 below for ease of discussion. The BSs 102 each includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and an I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell (e.g., 101 for BS 102A and 110 for BS 102B) where the BS 102 is located, and in general, to operate properly within the cell. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid/heterogeneous communication network in which the UE communicates with the BS 102, and with other UEs, e.g., between 104A and 104B. As described in further detail below, the UE 104 supports sidelink communications with other UE's as well as downlink/uplink communications between the BS 102 and the UE 104. As discussed above, sidelink communication allows the UEs 104A and 104B within a sidelink communication group 112 to establish a direct communication link with each other, or with other UEs from different cells, without requiring the BS 102 to relay data between UE's.

Figure 2:
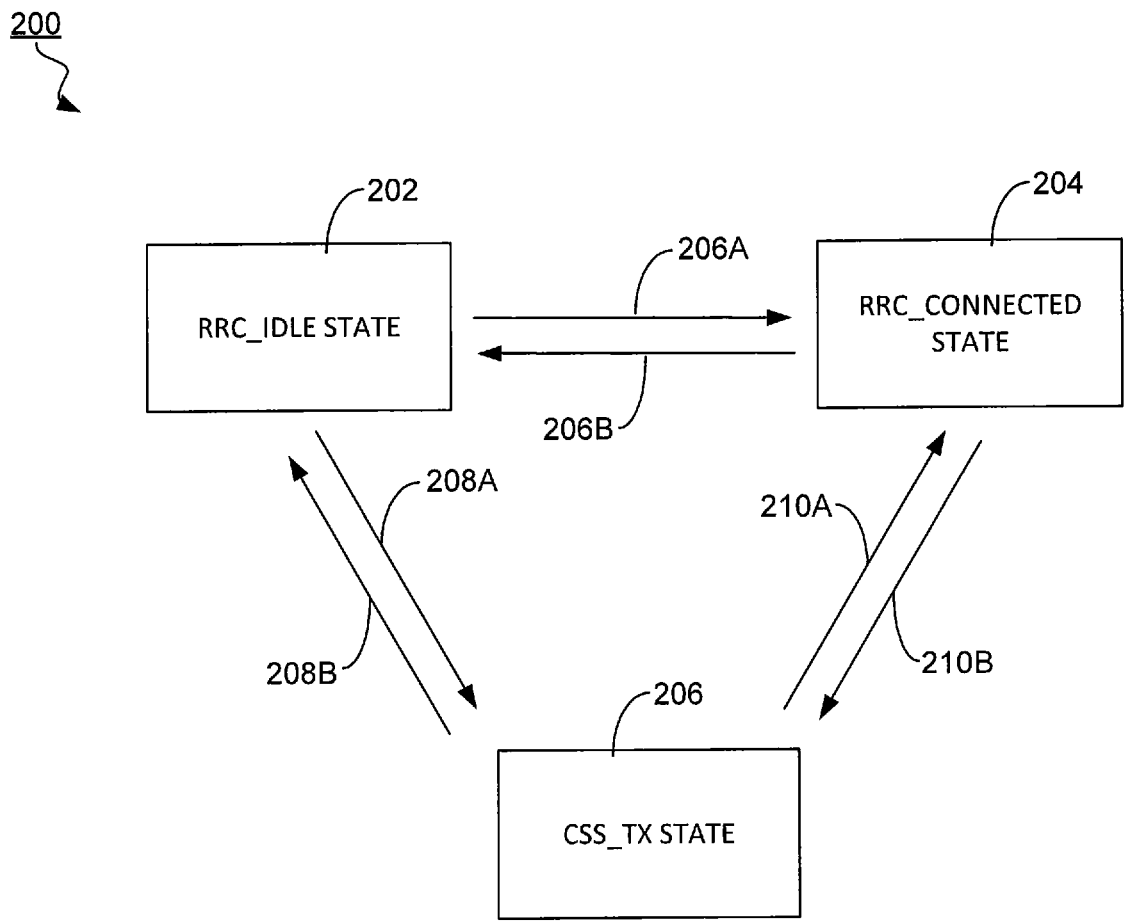
FIG. 2 illustrates a block diagram of three states of a UE and strategies when switching between states, in accordance with some embodiments of the present disclosure.

FIG. 2 illustrates a block diagram 200 of three states of a UE 104 and strategies when switching between states, in accordance with some embodiments of the present disclosure. In the illustrated embodiments, the three states of a UE 104 comprises an RRC idle state (hereinafter RRC_IDLE state 202), an RRC connected state (hereinafter RRC_CONNECTED state 204) and a state for data transmission on at least one common resource (hereinafter CSS_Tx state 206). A UE 104 in a CSS_Tx state 206 can perform a point-to-point communication with a BS 102 for data transmission and can directly monitor scheduling information of a common PDCCH from the BS 102 on a common search space.

In the illustrated embodiments, the CSS_Tx state 206 is different from the RRC_IDLE state 202 and the RRC_CONNECTED state 204. For example, a UE 104 in a RRC_IDLE state 202 can monitor a paging according to DRX parameters received from the BS 102, eDRX parameters from the NAS layer, PSM parameters, and a predefined rule. Further, a UE 104 in an RRC_IDLE state 202 can also select and/or reselect a cell according a detection of the channel quality in at least one adjacent cell; receive a system message, perform a PRACH (Physical Random Access Channel) procedure on a contention-based PRACH resource; perform data transmission schemes in a user plane (UP) and a control plane (CP); and monitor a common search space of a paging (CSS_Paging). A UE 104 in a RRC_CONNECTED state 204 can perform a point-to-point data transmission with the BS 102 and monitor a UE-specified search space (USS).

In some embodiments, when the UE 104 performs an uplink transmission with an identification of the UE 104 (hereinafter "UE-ID") on the at least one common resource, the UE 104 can switch from a RRC_IDLE state 202 to a CSS_Tx state 206. In some embodiments, when the UE 104 receives an indication of switching to an idle state and/or satisfies at least one condition to switch to an idle state, the UE 104 can switch from a CSS_Tx state 206 to a RRC_IDLE state 202. For example, when an idle-state timer is transmitted (e.g., in a System Information Block (SIB)), the UE 104 can start or restart the timer after a data transmission in a CSS_Tx state is completed. When no data reception or transmission is performed before the expiration of the timer, the UE 104 can switch from the CSS_Tx state to the RRC_IDLE state. For another example, when no related response is received before the expiration of a timer after the UE 104 transmits uplink information on the pre-configured common resource, the UE 104 can switch to the RRC_IDLE state. In some embodiments, the identification of the UE 104 can be one of the following: a non-access stratum (NAS) identification, and an identification configured by the BS 102.

In some embodiments, when the UE 104 receives an RRC message UE dedicated resource (e.g., UE-Specific Search Space (USS), UE-Specific SRB, UE-Specific DRB, etc.), the UE 104 can switch from a CSS_Tx state 206 to a RRC_CONNECTED state 204. In some embodiments, when the UE 104 receives a RRC reconfiguration message for releasing at least one specific resource, the UE 104 can switch from a RRC_CONNECTED state 204 to a CSS_Tx state 206. In some embodiments, when the UE 104 receives a RRC connection release message or indication, the UE 104 can switch from a RRC_CONNECTED state 204 to a RRC_IDLE state. In some embodiments, when the UE 104 receives a RRC connection establishment message or a RRC connection resume message, the UE 104 can switch from a RRC_IDLE state 202 to a RRC_CONNECTED state 204.

In some embodiments, the at least one common resource each comprises one of the following: a resource for uplink transmission with the first identification, a common search space, common configuration information of a Signaling Radio Bearer (SRB), common configuration information of a Data Radio Bearer (DRB), configuration information of a Radio Link Control (RLC) layer, a common Physical Downlink Shared Channel (PDSCH), a common resource for transmitting a Scheduling Request (SR) message, and a common resource for transmitting a Buffered Status Reporting (BSR) message. In some embodiments, the at least one common resource refers to a resource that can be utilized for two or more different purposes and/or utilized two or more devices or nodes.

In some embodiments, the resource for uplink transmission with the identification of the UE 104 can be at least one of the following: a preamble resource, a physical uplink shared channel (PUSCH) resource, and a preamble and PUSCH resource. In some embodiments, the resource for uplink transmission can correspond to different carriers in a cell with a plurality of carriers and/or different coverage enhancement levels (CELs). For example, a resource for uplink transmission can be configured on each of the plurality of carriers carrying the identification of the UE 104; a plurality of resource for uplink transmission with different CELs carrying the identification of the UE 104; a plurality of downlink carriers corresponding to the plurality of carriers can be configured. For another example, the UE 104 can select at least one preconfigured resource set for uplink transmission according to its CEL, and then further select at least one resource in the at least one preconfigured resource set according to a pre-defined rule, e.g., UE-ID mod a number of resources; random algorithm, or a weight function according to the resource.

In some embodiments, the common search space wherein the common search space comprises configuration information for monitoring the common Physical Downlink Control Channel (PDCCH), wherein the configuration information comprises at least one of the following: a monitoring starting time, a monitoring period, and a monitoring interval. In some embodiments, a same configuration for monitoring the common PDCCH can be used for all the UEs 104 in the cell. In some other embodiments, different configurations for monitoring the common PDCCH can be used for different groups of UEs.

Specifically, when the same configuration for monitoring the common PDCCH is used for all the UEs 104 in the cell, the BS 102 configures the following parameters for a specific search space according to the CEL, including: a Narrowband Physical Downlink Control Channel (NPDCCH) monitoring interval, a NPDCCH monitoring starting point, and a NPDCCH monitoring repetition number. In some embodiments, corresponding parameters of a common space during a random access process (CSS_RA) can be used, for example, npdcch-Offset-RA, npdcch-StartSF-CSS-RA, and npdcch-NumRepetitions-RA.

Similarly, when different configurations for monitoring the common PDCCH is used for different groups of UEs, the BS 102 can configure at least one of the following parameters for monitoring, including: a PDCCH monitoring period, a number of PDCCH monitoring starting points in a PDCCH monitoring period, a PDCCH monitoring starting points in a PDCCH monitoring period, and a PDCCH monitoring repetition number. For example, if a number of PDCCH monitoring starting points in a PDCCH monitoring period is configured, the BS 102 can also configure a pre-determined strategy in order to derive the PDCCH monitoring starting points according to the PDCCH monitoring period and the number of PDCCH monitoring starting points. The UE 104 can then determine the PDCCH monitoring position according to the PDCCH monitoring period, the number of PDCCH monitoring starting points or the PDCCH monitoring starting points, and the UE-ID of the UE 104 based on the pre-determined strategy. In some embodiments, the pre-determined strategy can be UE-ID mod the number of PDCCH monitoring starting points in a PDCCH monitoring period, in which the UE-ID is evenly distributed on the PDCCH monitoring starting points. Specifically, the PDCCH monitoring period can be $1/n$ or $n$ times of the paging monitoring period, wherein n is a positive integer. In some embodiments, n can be 2 to the power of m, wherein m is a non-negative integer. The UE 104 can then determine the PDCCH monitoring position based on the PDCCH monitoring period and the predetermined strategy.

Figure 3:
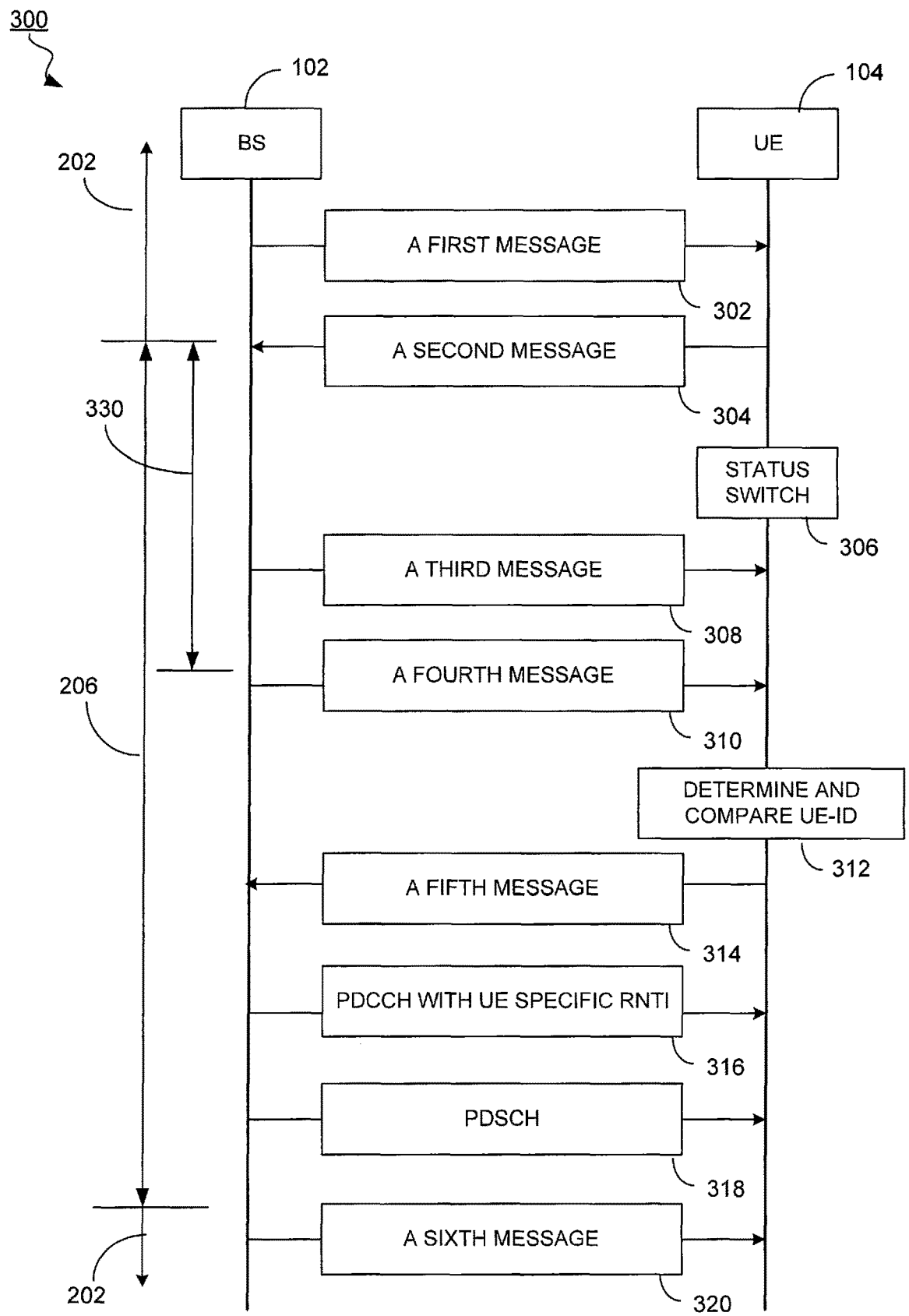
FIG. 3 illustrates a method for performing a data transmission on pre-configured common resources, in accordance with some embodiments of the present disclosure.

FIG. 3 illustrates a method 300 for performing a data transmission on pre-configured common resources, in accordance with some embodiments of the present disclosure. It is understood that additional operations may be provided before, during, and after the method 300 of FIG. 3, and that some operations may be omitted or reordered. The communication system comprises 1 BS 102 and 1 UE 104. It should be noted that FIG. 3 is an example and a communication system comprising any combination of BSs 102 and UEs 104 are within the scope of this disclosure.

The method 300 starts with operation 302 in which the BS 102 transmits a first message to the UE 104 according to some embodiments. In some embodiments, the first message comprises configuration information of at least one common resource for data transmission by the UE 104. In some embodiments, the first message is a system information block (SIB). n some embodiments, the at least one common resource each comprises one of the following: a resource for uplink transmission with the first identification, a common search space, common configuration information of a Signaling Radio Bearer (SRB), common configuration information of a Data Radio Bearer (DRB), configuration information of a Radio Link Control (RLC) layer, a common Physical Downlink Shared Channel (PDSCH), a common resource for transmitting a Scheduling Request (SR) message, and a common resource for transmitting a Buffered Status Reporting (BSR) message.

In some embodiments, the common search space wherein the common search space comprises configuration information for monitoring the common Physical Downlink Control Channel (PDCCH), wherein the configuration information comprises at least one of the following: a monitoring starting time, a monitoring period, and a monitoring interval. In some embodiments, a same configuration for monitoring the common PDCCH can be used for all the UEs 104 in the cell. In some other embodiments, different configurations for monitoring the common PDCCH can be used for different groups of UEs.

Specifically, when the same configuration for monitoring the common PDCCH is used for all the UEs 104 in the cell, the BS 102 configures the following parameters for a specific search space according to the CEL, including: a Narrowband Physical Downlink Control Channel (NPDCCH) monitoring interval, a NPDCCH monitoring starting point, and a NPDCCH monitoring repetition number. In some embodiments, corresponding parameters of a common space during a random access process (CSS_RA)

can be used, for example, npdcch-Offset-RA, npdcch-StartSF-CSS-RA, and npdcch-NumRepetitions-RA.

Similarly, when different configurations for monitoring the common PDCCH is used for different groups of UEs, the BS 102 can configure at least one of the following parameters for monitoring, including: a PDCCH monitoring period, a number of PDCCH monitoring starting points in a PDCCH monitoring period, a PDCCH monitoring starting points in a PDCCH monitoring period, and a PDCCH monitoring repetition number. For example, if a number of PDCCH monitoring starting points in a PDCCH monitoring period is configured, the BS 102 can also configure a pre-determined strategy in order to derive the PDCCH monitoring starting points according to the PDCCH monitoring period and the number of PDCCH monitoring starting points. The UE 104 can then determine the PDCCH monitoring position according to the PDCCH monitoring period, the number of PDCCH monitoring starting points or the PDCCH monitoring starting points, and the UE-ID of the UE 104 based on the pre-determined strategy. In some embodiments, the pre-determined strategy can be UE-ID mod the number of PDCCH monitoring starting points in a PDCCH monitoring period, in which the UE-ID is evenly distributed on the PDCCH monitoring starting points. Specifically, the PDCCH monitoring period can be 1/n or n times of the paging monitoring period, wherein n is a positive integer. In some embodiments, n can be 2 to the power of m, wherein m is a non-negative integer. The UE 104 can then determine the PDCCH monitoring position based on the PDCCH monitoring period and the predetermined strategy.

In some embodiments, the identification of the UE 104 can be one of the following: a non-access stratum (NAS) identification, and an identification configured by the BS 102. In some embodiments, the resource for uplink transmission with the identification of the UE 104 can be at least one of the following: a preamble resource, a physical uplink shared channel (PUSCH) resource, and a preamble and PUSCH resource.

The method 300 continues with operation 304 in which the UE 104 in an RRC-idle state transmits a second message to the BS 102 according to some embodiments. In some embodiments, the second message comprises an UE-ID and is transmitted on the at least one common resource. In some embodiments, the second message further comprises at least one of the following: a NAS Protocol Data Unit (PDU), a data PDU, a first Radio Resource Control (RRC) message, a corresponding MAC Control Element (CE), a Scheduling Request (SR) message, and a Buffered Status Reporting (BSR) message. In some embodiments, RRC message comprises at least one of the following: an RRCConnectionRequest message, an RRCConnectionResumeRequest message, an RRCEarlyDataRequest message, and an RRCConnectionReestablishmentRequest message. In some embodiments, operation 304 further comprises starting a state protection timer by the UE 104.

The method 300 continues with operation 306 in which the UE 104 initiates a monitoring process of a common PDCCH (Physical Downlink Control Channel) according to some embodiments. In some embodiments, the common PDCCH comprises a data transmission status on the at least one common resource. In some embodiments, the UE 104 switches from the idle state to the data transmission state, CSS_Tx state, on the at least one common resource in operation 306.

The method 300 continues with operation 308 in which the BS 102 transmits a third message to the UE 104 before the expiration of the state protection timer according to some embodiments. In some embodiments, the third message is transmitted on the common PDCCH on the at least one common resource. In some embodiments, the third message comprises a UE-ID of the UE 104 and information of at least one scheduling resource. In some embodiments, a C-RNTI (Cell Radio Network Temporary Identifier) can be used to scramble the information of the at least one scheduling resource on the common PDCCH. For example, when a preamble is transmitted in the second message, a RA (Random Access)-RNTI can be used to scramble the scheduling information on the common PDCCH.

In some embodiments, when the third message is not received by the UE 104 before the expiration of the state protection timer, the method 300 can continue with operation 304 as configured by the BS 102 in the first message, e.g., SIB. In some embodiments, a number of times that the UE 104 can repeat the operation 304 is also configured by the BS 102 and transmitted to the UE 104 in the first message. In some embodiments, when the third message is not received by the UE 104 within the state protection timer, the UE 104 can perform one of the following access procedures: selecting at least one common resource on a higher CEL and transmitting uplink information to the BS 102 with the UE-ID, and a CBRA (Contention-Based Random Access).

The method 300 continues with operation 310 in which the BS 102 transmits a fourth message to the UE 104 on the at least one scheduling resource according to some embodiments. In some embodiments, the fourth message comprises the UE-ID received by the BS 102 from the UE 104 during operation 304 or a different UE-ID derived based on the UE-ID received by the BS 102 from the UE 104 during operation 304 according to a rule. In some embodiments, the rule is known by the BS 102 and the UE 104. In some embodiments, the fourth message further comprises a UE-specific RNTI configured by the BS 102. In some embodiments, the UE-specific RNTI comprises at least one of the following: a C-RNTI, a RA-RNTI a SPS-RNTI, and a newly defined UE-RNTI. In some embodiments, the fourth message further comprises a reception confirmation message of the second message. In some embodiments, the fourth message further comprises information of at least one downlink resource configured by the BS 102 for downlink transmission to the UE 104. In some embodiments, the fourth message further comprises at least one DL data transmitted to the UE 104. In some embodiments, the fourth message further comprises information of at least one uplink resource configured by the BS 102 for uplink transmission by the UE 104, wherein the at least one uplink resource can be used for retransmitting the second message, transmitting a new message or new data. For example, when the second message transmitted in operation 304 is a preamble, the fourth message can be an RAR and/or corresponding MAC CE.

In some embodiments, when a cell comprises a plurality of carriers, the fourth message in the operation 310 can also carry information of a target carrier previously used by the UE 104. Furthermore, when the fourth message comprises the information of the target carrier, the UE 104 can perform the following operations in method 300 on the target carrier, which is discussed in detail below.

In some embodiments, when the second message in the operation 304 comprise a request message for RRC connection, the fourth message can be second RRC message. In some embodiments, the second RRC message comprises at least one of the following: an RRCEarlyDataComplete message, an RRCConnectionSetup message, an RRCConnectionResume message, an RRCConnectionRelease message, an RRCConnectionReestablishment message, and an RRCEarlyDataComplete message. In some embodiments, when the UE 104 receives the fourth message with the RRC response message, the UE 104 can switch status to an RRC_CONNECTED state or an RRC_IDLE state. In some other embodiments, when the UE 104 receives the fourth message with the RRC response message, the UE 104 can remain a CSS_Tx state according to the RRC response message. In some embodiments, if the first RRC message is a Data Transmission Request message, the RRC response message is a Data Transmission Complete message. For example, when the second RRC message comprises at least one of the following: RRCConnectionRelease with an idle state indication, RRCEarlyDataComplete with an idle state indication, and a Data Transmission Complete message, the UE 104 switches from a CSS_Tx state to an RRC_IDLE state. For another example, when the second RRC message comprises at least one of the following: the RRCConnectionSetup message, the RRCConnectionResume message, the RRCConnectionReestablishment message, and the RRCConnectionReconfiguration message, the UE 104 switches from a CSS_Tx state to the RRC_CONNECTED state.

The method 300 continues with operation 312 in which the UE 104 determines and compares the UE-ID received in the third or fourth message with the UE-ID of the UE 104 according to some embodiments. In some embodiments, when the UE-ID received in the third or fourth message from the BS 102 matches the UE-ID of the UE 104, the UE 104 is then successfully identified and the contention resolution is determined as successful.

The method 300 continues with operation 314 in which the UE 104 transmits a fifth message to the BS 102 according to some embodiments. In some embodiments, the UE 104 transmits the fifth message on the at least one uplink grant resource. In some embodiments, the fifth message comprises communication data for uplink transmission.

The method 300 continues with operation 316 in which the UE 104 monitor the UE-specific RNTI on the PDCCH scheduling resources configured by the BS 102 in the fourth message according to some embodiments.

The method 300 continues with operation 318 in which the UE 104 monitor a PDSCH on the downlink specific resources configured by the BS 102 in operation 316 according to some embodiments. In some embodiments, when the resource configured by the BS 102 comprises at least one uplink specific resource, the UE 104 transmits a PUSCH on the at least on uplink specific resource.

The method 300 continues with operation 320 in which the BS 102 transmits a sixth message to the UE 104 according to some embodiments. In some embodiments, the sixth message comprises a state-switch indication message, which indicates the UE 104 to switch to a RRC_IDLE state. In some embodiments, the six message can be one of the following: an RRC release message, a state-switch indication in a MAC CE, and a state-switch indication in a PDCCH DCI (downlink control information). In some embodiments, the state switching can be also triggered by a timer. In some embodiments, the timer for an RRC_IDLE state can be transmitted in the first message from the BS 102 to the UE 104. In some embodiments, when the data transmission between the BS 102 and the UE 104 on the at least one common resource is completed, the timer can be started or restarted. In some embodiments, when there is no data transmission before the expiration of the timer, the UE 104 can switch to the RRC_IDLE state automatically.

Figure 4:
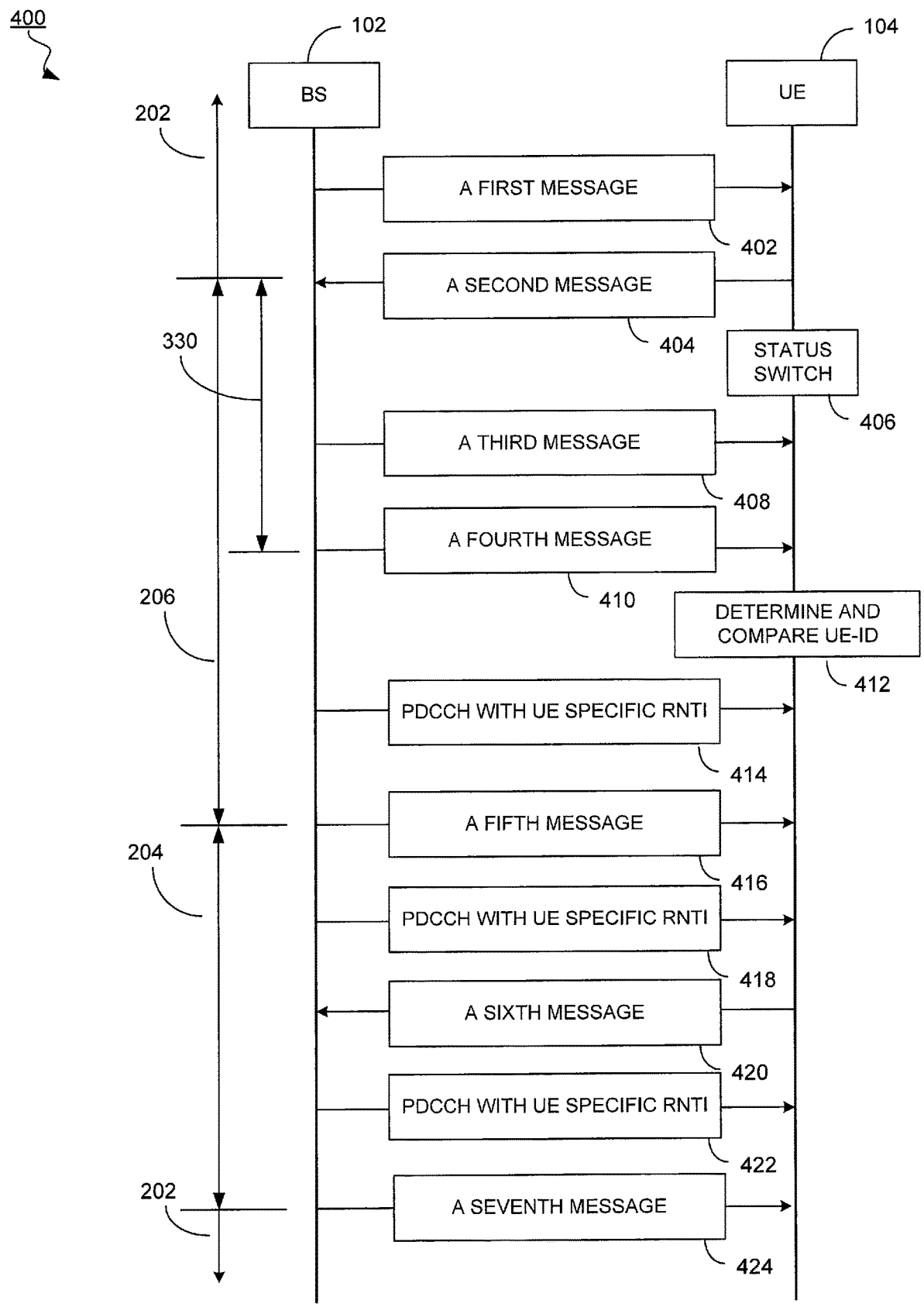
FIG. 4 illustrates a method for performing a data transmission on pre-configured common resources, in accordance with some embodiments of the present disclosure.

FIG. 4 illustrates a method 400 for performing a data transmission on pre-configured common resources, in accordance with some embodiments of the present disclosure. It is understood that additional operations may be provided before, during, and after the method 400 of FIG. 4, and that some operations may be omitted or reordered. The communication system comprises 1 BS 102 and 1 UE 104. It should be noted that FIG. 4 is an example and a communication system comprising any combination of BSs 102 and UEs 104 are within the scope of this disclosure.

The method 400 starts with operation 402 in which the BS 102 transmits a first message to the UE 104 according to some embodiments. In some embodiments, the first message comprises configuration information of at least one common resource for data transmission by the UE 104. In some embodiments, the first message is a system information block (SIB). n some embodiments, the at least one common resource each comprises one of the following: a resource for uplink transmission with the first identification, a common search space, common configuration information of a Signaling Radio Bearer (SRB), common configuration information of a Data Radio Bearer (DRB), configuration information of a Radio Link Control (RLC) layer, a common Physical Downlink Shared Channel (PDSCH), a common resource for transmitting a Scheduling Request (SR) message, and a common resource for transmitting a Buffered Status Reporting (BSR) message.

In some embodiments, the common search space wherein the common search space comprises configuration information for monitoring the common Physical Downlink Control Channel (PDCCH), wherein the configuration information comprises at least one of the following: a monitoring starting time, a monitoring period, and a monitoring interval. In some embodiments, a same configuration for monitoring the common PDCCH can be used for all the UEs 104 in the cell. In some other embodiments, different configurations for monitoring the common PDCCH can be used for different groups of UEs.

Specifically, when the same configuration for monitoring the common PDCCH is used for all the UEs 104 in the cell, the BS 102 configures the following parameters for a specific search space according to the CEL, including: a Narrowband Physical Downlink Control Channel (NPDCCH) monitoring interval, a NPDCCH monitoring starting point, and a NPDCCH monitoring repetition number. In some embodiments, corresponding parameters of a common space during a random access process (CSS_RA) can be used, for example, npdcch-Offset-RA, npdcch-StartSF-CSS-RA, and npdcch-NumRepetitions-RA.

Similarly, when different configurations for monitoring the common PDCCH is used for different groups of UEs, the BS 102 can configure at least one of the following parameters for monitoring, including: a PDCCH monitoring period, a number of PDCCH monitoring starting points in a PDCCH monitoring period, a PDCCH monitoring starting points in a PDCCH monitoring period, and a PDCCH monitoring repetition number. For example, if a number of PDCCH monitoring starting points in a PDCCH monitoring period is configured, the BS 102 can also configure a pre-determined strategy in order to derive the PDCCH monitoring starting points according to the PDCCH monitoring period and the number of PDCCH monitoring starting points. The UE 104 can then determine the PDCCH monitoring position according to the PDCCH monitoring period, the number of PDCCH monitoring starting points or the PDCCH monitoring starting points, and the UE-ID of the UE 104 based on the pre-determined strategy. In some embodiments, the pre-determined strategy can be UE-ID mod the number of PDCCH monitoring starting points in a PDCCH monitoring period, in which the UE-ID is evenly distributed on the PDCCH monitoring starting points. Specifically, the PDCCH monitoring period can be 1/n or n times of the paging monitoring period, wherein n is a positive integer. In some embodiments, n can be 2 to the power of m, wherein m is a non-negative integer. The UE 104 can then determine the PDCCH monitoring position based on the PDCCH monitoring period and the predetermined strategy.

In some embodiments, the identification of the UE 104 can be one of the following: a non-access stratum (NAS) identification, and an identification configured by the BS 102. In some embodiments, the resource for uplink transmission with the identification of the UE 104 can be at least one of the following: a preamble resource, a physical uplink shared channel (PUSCH) resource, and a preamble and PUSCH resource.

The method 400 continues with operation 404 in which the UE 104 in an RRC-idle state transmits a second message to the BS 102 according to some embodiments. In some embodiments, the second message comprises an UE-ID and is transmitted on the at least one common resource. In some embodiments, the second message further comprises at least one of the following: a NAS Protocol Data Unit (PDU), a data PDU, a first Radio Resource Control (RRC) message, a corresponding MAC Control Element (CE), a SR message, and a BSR message. In some embodiments, RRC message comprises at least one of the following: an RRCConnectionRequest message, an RRCConnectionResumeRequest message, an RRCEarlyDataRequest message, and an RRCConnectionReestablishmentRequest message. In some embodiments, operation 304 further comprises starting a state protection timer by the UE 104.

The method 400 continues with operation 406 in which the UE 104 initiates a monitoring process of a common PDCCH (Physical Downlink Control Channel) according to some embodiments. In some embodiments, the common PDCCH comprises a data transmission status on the at least one common resource. In some embodiments, the UE 104 switches from the idle state to the data transmission state, CSS_Tx state, on the at least one common resource in operation 306.

The method 400 continues with operation 408 in which the BS 102 transmits a third message to the UE 104 before the expiration of the state protection timer according to some embodiments. In some embodiments, the third message comprises at least one scheduling resource for a Random Access Response (RAR) message and a corresponding MAC Control Element (CE). In some embodiments, a common RNTI (Radio Network Temporary Identifier) can be used to scramble information of the at least one scheduling resource on the common PDCCH. In some embodiments, the third message further comprises a UE-ID of the UE 104. For example, when a preamble is transmitted in the second message, a RA (Random Access)-RNTI can be used to scramble the scheduling information on the common PDCCH.

In some embodiments, when the third message is not received by the UE 104 before the expiration of the state protection timer, the method 300 can continue with operation 304 as configured by the BS 102 in the first message, e.g., SIB. In some embodiments, a number of times that the UE 104 can repeat the operation 304 is also configured by the BS 102 and transmitted to the UE 104 in the first message. In some embodiments, when the third message is not received by the UE 104 within the state protection timer, the UE 104 can perform one of the following access procedures: selecting at least one common resource on a higher CEL and transmitting uplink information to the BS 102 with the UE-ID, and a CBRA (Contention-Based Random Access).

The method 400 continues with operation 410 in which the BS 102 transmits a fourth message to the UE 104 on the at least one scheduling resource according to some embodiments. In some embodiments, the fourth message comprises the UE-ID received by the BS 102 from the UE 104 during operation 304 or a different UE-ID derived based on the UE-ID received by the BS 102 from the UE 104 during operation 304 according to a rule. In some embodiments, the rule is known by the BS 102 and the UE 104. In some embodiments, the fourth message further comprises a UE-specific RNTI configured by the BS 102. In some embodiments, the UE-specific RNTI comprises at least one of the following: a C-RNTI, a RA-RNTI a SPS-RNTI, and a newly defined UE-RNTI. In some embodiments, the fourth message further comprises at least one uplink resource configured by the BS 102 for uplink transmission by the UE 104. For example, when the second message transmitted in operation 304 is a preamble, the fourth message can be an RAR and/or corresponding MAC CE.

In some embodiments, when a cell comprises a plurality of carriers, the fourth message in the operation 310 can also carry information of a target carrier previously used by the UE 104. Furthermore, when the fourth message comprises the information of the target carrier, the UE 104 can perform the following operations in method 300 on the target carrier, which is discussed in detail below.

In some embodiments, when the second message in the operation 304 comprise a request message for RRC connection, the fourth message can be second RRC message. In some embodiments, the second RRC message comprises at least one of the following: an RRCConnectionSetup message, an RRCConnectionResume message, an RRCConnectionRelease message, an RRCConnectionReestablishment message, and an RRCEarlyDataComplete message. In some embodiments, when the UE 104 receives the fourth message with the RRC response message, the UE 104 can switch status to an RRC_CONNECTED state or an RRC_IDLE state. In some other embodiments, when the UE 104 receives the fourth message with the RRC response message, the UE 104 can remain a CSS_Tx state according to the RRC response message.

The method 400 continues with operation 412 in which the UE 104 determines and compares the UE-ID received in the fourth message with the UE-ID of the UE 104 according to some embodiments. In some embodiments, when the UE-ID received in the fourth message from the BS 102 matches the UE-ID of the UE 104, the UE 104 is then successfully identified and the contention resolution is considered successful.

The method 400 continues with operation 414 in which the UE 104 monitors the UE-specific RNTI on the PDCCH scheduling resources configured by the BS 102 in the fourth message according to some embodiments.

The method 400 continues with operation 416 in which the UE 104 receives a fifth message from the BS 102 according to some embodiments. In some embodiments, the fifth message is a PDSCH transmitted on the downlink specific resource configured by the BS 102. In some embodiments, the PDSCH comprises a RRC message with UE-specific configuration information. In some embodiments, the RRC message comprises at least one of the following: an RRCConnectionSetup message, an RRCConnectionResume message, an RRCConnectionReestablishment message, an RRCConnectionReconfiguration message, and any downlink message for resource configuration of the UE 104.

The method 400 continues with operation 418 in which the UE 104 detects the PDCCH with C-RNTI configured by the BS 102 for the UE 104 according to some embodiments. In some embodiments, when the RRC message received by the UE 104 from the BS 102 does not comprise the C-RNTI, the UE 104 can select the UE-specific RNTI received from the BS 102 during operation 410 as the C-RNTI. In some other embodiments, when the RRC message received by the UE 104 from the BS 102 does not comprise the C-RNTI, the UE 104 can select a previously used C-RNTI as the C-RNTI.

The method 400 continues with operation 420 in which the UE 104 transmits a sixth message according to some embodiments. In some embodiments, the sixth message is a RRC response message in response to the RRC message received from the BS 104 during the operation 416. In some embodiments, the RRC response message is transmitted on at least one uplink specific resource configured by the BS 102.

The method 400 continues with operation 422 in which the UE 104 detects the PDCCH with C-RNTI configured by the BS 102 for the UE 104 according to some embodiments. In some embodiments, when the RRC message received by the UE 104 from the BS 102 does not comprise the C-RNTI, the UE 104 can select the UE-specific RNTI received from the BS 102 during operation 410 as the C-RNTI. In some other embodiments, when the RRC message received by the UE 104 from the BS 102 does not comprise the C-RNTI, the UE 104 can select a previously used C-RNTI as the C-RNTI.

The method 400 continues with operation 424 in which the BS 102 in which the BS 102 transmits a seventh message to the UE 104 according to some embodiments. In some embodiments, the seventh message comprises a state-switch indication message, which indicates the UE 104 to switch to a RRC-IDLE state. In some embodiments, the seventh message can be one of the following: an RRCConnectionRelease message, a state-switch indication in a MAC CE, and a state-switch indication in a PDCCH DCI (downlink control information). In some embodiments, the state switching can be also triggered by a timer. In some embodiments, the timer for an RRC_IDLE state can be transmitted in the first message from the BS 102 to the UE 104. In some embodiments, when the data transmission between the BS 102 and the UE 104 on the at least one common resource is completed, the timer can be started or restarted. In some embodiments, when there is no data transmission before the expiration of the timer, the UE 104 can switch to the RRC_IDLE state automatically.

Figure 5:
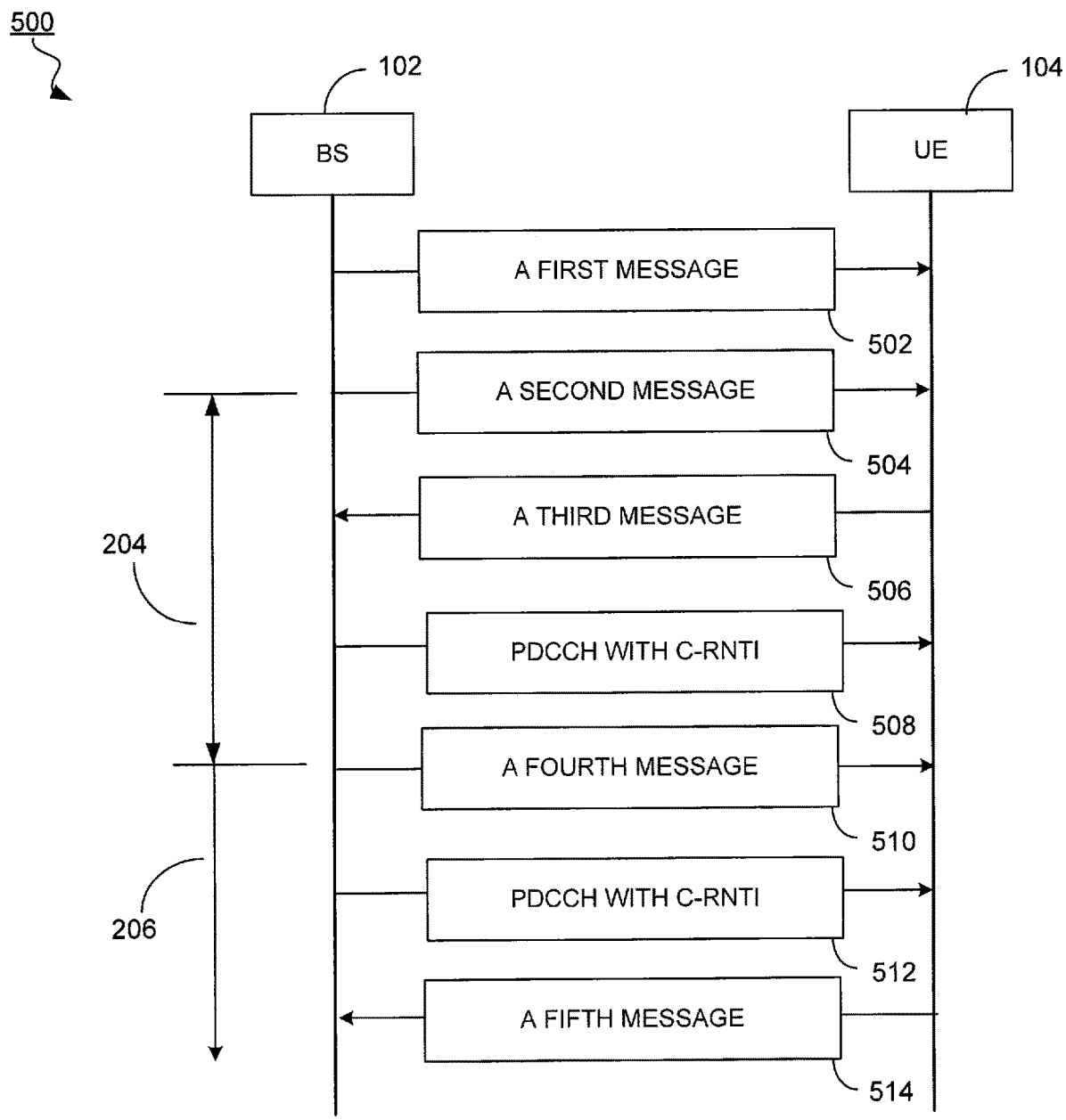
FIG. 5 illustrates a method for performing a data transmission on pre-configured common resources, in accordance with some embodiments of the present disclosure.

FIG. 5 illustrates a method 500 for performing a data transmission on pre-configured common resources, in accordance with some embodiments of the present disclosure. It is understood that additional operations may be provided before, during, and after the method 500 of FIG. 5, and that some operations may be omitted or reordered. The communication system comprises 1 BS 102 and 1 UE 104. It should be noted that FIG. 5 is an example and a communication system comprising any combination of BSs 102 and UEs 104 are within the scope of this disclosure.

The method 500 starts with operation 502 in which the BS 102 transmits a first message to the UE 104 according to some embodiments. In some embodiments, the first message comprises configuration information of at least one common resource for data transmission by the UE 104. In some embodiments, the first message is a system information block (SIB). n some embodiments, the at least one common resource each comprises one of the following: a resource for uplink transmission with the first identification, a common search space, common configuration information of a Signaling Radio Bearer (SRB), common configuration information of a Data Radio Bearer (DRB), configuration information of a Radio Link Control (RLC) layer, a common Physical Downlink Shared Channel (PDSCH), a common resource for transmitting a Scheduling Request (SR) message, and a common resource for transmitting a Buffered Status Reporting (BSR) message.

In some embodiments, the common search space wherein the common search space comprises configuration information for monitoring the common Physical Downlink Control Channel (PDCCH), wherein the configuration information comprises at least one of the following: a monitoring starting time, a monitoring period, and a monitoring interval. In some embodiments, a same configuration for monitoring the common PDCCH can be used for all the UEs 104 in the cell. In some other embodiments, different configurations for monitoring the common PDCCH can be used for different groups of UEs.

Specifically, when the same configuration for monitoring the common PDCCH is used for all the UEs 104 in the cell, the BS 102 configures the following parameters for a specific search space according to the CEL, including: a Narrowband Physical Downlink Control Channel (NPDCCH) monitoring interval, a NPDCCH monitoring starting point, and a NPDCCH monitoring repetition number. In some embodiments, corresponding parameters of a common space during a random access process (CSS_RA) can be used, for example, npdcch-Offset-RA, npdcch-StartSF-CSS-RA, and npdcch-NumRepetitions-RA.

Similarly, when different configurations for monitoring the common PDCCH is used for different groups of UEs, the BS 102 can configure at least one of the following parameters for monitoring, including: a PDCCH monitoring period, a number of PDCCH monitoring starting points in a PDCCH monitoring period, a PDCCH monitoring starting points in a PDCCH monitoring period, and a PDCCH monitoring repetition number. For example, if a number of PDCCH monitoring starting points in a PDCCH monitoring period is configured, the BS 102 can also configure a pre-determined strategy in order to derive the PDCCH monitoring starting points according to the PDCCH monitoring period and the number of PDCCH monitoring starting points. The UE 104 can then determine the PDCCH monitoring position according to the PDCCH monitoring period, the number of PDCCH monitoring starting points or the PDCCH monitoring starting points, and the UE-ID of the UE 104 based on the pre-determined strategy. In some embodiments, the pre-determined strategy can be UE-ID mod the number of PDCCH monitoring starting points in a PDCCH monitoring period, in which the UE-ID is evenly distributed on the PDCCH monitoring starting points. Specifically, the PDCCH monitoring period can be 1/n or n times of the paging monitoring period, wherein n is a positive integer. In some embodiments, n can be 2 to the power of m, wherein m is a non-negative integer. The UE 104 can then determine the PDCCH monitoring position based on the PDCCH monitoring period and the predetermined strategy.

In some embodiments, the identification of the UE 104 can be one of the following: a non-access stratum (NAS) identification, and an identification configured by the BS 102. In some embodiments, the resource for uplink transmission with the identification of the UE 104 can be at least one of the following: a preamble resource, a physical uplink shared channel (PUSCH) resource, and a preamble and PUSCH resource.

The method 500 continues with operation 504 in which the UE 104 receives a second message from the BS 102 according to some embodiments. In some embodiments, the second message is a PDSCH transmitted on the downlink specific resource configured by the BS 102. In some embodiments, the PDSCH comprises a first RRC message with UE-specific configuration information. In some embodiments, the first RRC message comprises at least one of the following: an RRCConnectionSetup message, an RRCConnectionResume message, an RRCConnectionReestablishment message, an RRCConnectionReconfiguration message, and any downlink message for resource configuration of the UE 104. In some embodiments, the first RRC message further comprises a Data Transmission Request message.

In some embodiments, after receiving the second message the UE 104 can maintain or switch to a RRC_CONNECTED state from a previous state, wherein the previous state can be one of the following: an idle state in a PRACH process, an active state for data transmission on the at least one common resource, an active state for data transmission on at least one specific resource, an inactive state in NR (new radio), and a light connection state in LTE.

The method 500 continues with operation 506 in which the UE 104 transmits a third message to the BS 102 according to some embodiments. In some embodiments, the third message comprises a response message to the second message received from the BS 102 during the operation 504, for example an RRC response message.

The method 500 continues with operation 508 in which the UE 104 detects a PDCCH with C-RNTI configured by the BS 102 for the UE 104 according to some embodiments.

The method 500 continues with operation 510 in which the BS 102 transmits a fourth message to the UE 104 according to some embodiments. In some embodiments, the fourth message comprises a PDSCH transmitted on at least one downlink specific resource configured by the BS 102 in operation. In some embodiments, the fourth message comprises an indication for the UE 104 to switch to a data transmission state on the at least one common resource (CSS_Tx). In some embodiments, after receiving the PDSCH, the UE 104 switches to the data transmission state on the at least on common resource. In some embodiments, the indication can be a second RRC message or a MAC CE. In some embodiments, the second RRC message can be at least one of the following: an RRCConnectionReestablishment message, an RRCConnectionRelease message, and any downlink message for configuring at least one specific resource for the UE 104.

In some embodiments, the second RRC message can be an RRCConnectionRelease message or an RRCConnectionReconfiguration message for the indication of the state of the RRC-specific configuration (i.e., release or suspend) when the UE 104 switches to a CSS_Tx state (i.e., data transmission on the at least one common resource). In some embodiments, the UE connection context can be stored by the UE and the BS which can be used to resume a RRC-specific connection. In some embodiments, the indication can be also carried by a DCI during operation 508 (e.g., PDCCH).

In some embodiments, the state switching by the UE 104 to a CSS_Tx state can be also triggered by a timer. In some embodiments, the timer for switching from the RRC_CONNECTED to the CSS_Tx state can be transmitted in the second message from the BS 102 to the UE 104. In some embodiments, when the data transmission between the BS 102 and the UE 104 on the at least one common resource is completed, the timer can be started or restarted. In some embodiments, when there is no data transmission before the expiration of the timer, the UE 104 can switch to the CSS_Tx state automatically.

The method 500 continues with operation 512 in which the UE 104 detects a PDCCH with C-RNTI configured by the BS 102 for the UE 104 according to some embodiments.

The method 500 continues with operation 514 in which the BS 102 transmits a fourth message to the UE 104 according to some embodiments. In some embodiments, upon reception the fourth message, the UE 104 transmits the fifth message to confirm that the fourth message is received. In some embodiments, when the fourth message is an RRCConnectionReconfiguration message, the fifth message can be an RRCConnectionReconfigurationComplete message.

Figure 6:
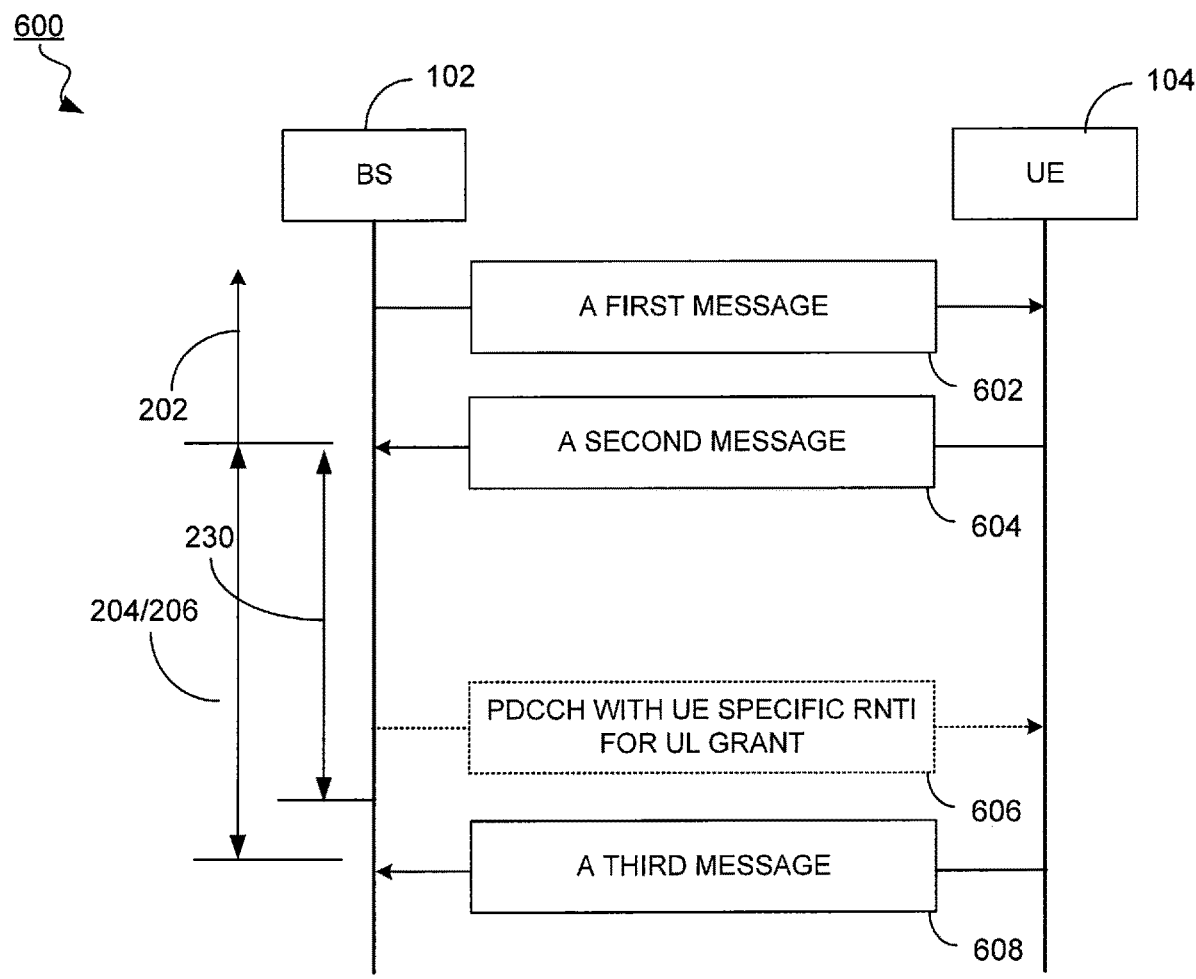
FIG. 6 illustrates a method for performing a data transmission on pre-configured common resources, in accordance with some embodiments of the present disclosure.

FIG. 6 illustrates a method 600 for performing a data transmission on pre-configured common resources, in accordance with some embodiments of the present disclosure. It is understood that additional operations may be provided before, during, and after the method 600 of FIG. 6, and that some operations may be omitted or reordered. The communication system comprises 1 BS 102 and 1 UE 104. It should be noted that FIG. 4 is an example and a communication system comprising any combination of BSs 102 and UEs 104 are within the scope of this disclosure.

The method 600 starts with operation 602 in which the BS 102 transmits a first message to the UE 104 according to some embodiments. In some embodiments, the first message is a system information block (SIB) message. In some embodiments, the SIB message comprises at least one of the following: information of at least one common resource for scheduling request (SR) or buffered status reporting (BSR), and a maximum number of times to transmit SR or BSR on the at least on common resource. In some embodiments, the at least one common resource each comprises one of the following resource: an uplink resource that is capable to carry a UE-ID and BSR, and an uplink resource that is capable to carry an UE-ID and SR. In some embodiments, the UE-ID can be a non-access stratum (NAS) UE-ID or a UE-ID configured by the BS 102.

The method 600 continues with operation 604 in which the UE 104 transmits a second message to the BS 102 according to some embodiments. In some embodiments, when the UE 104 requires data transmission to the BS 102 before receiving at least one uplink grant resource configured by the BS 102, the UE 104 transmits the second message to the BS 102. In some embodiments, the second message is transmitted on the at least one common resource for SR or BSR. In some embodiments, the second message comprises an SR or a BSR with the UE-ID of the UE 104. In some embodiments, the operation 604 also comprises starting a timer for SR or BSR confirmation. In some embodiments, the second message with the SR or BSR carrying the UE-ID of the UE 104 can be transmitted by a MAC CE.

Figure 7A:
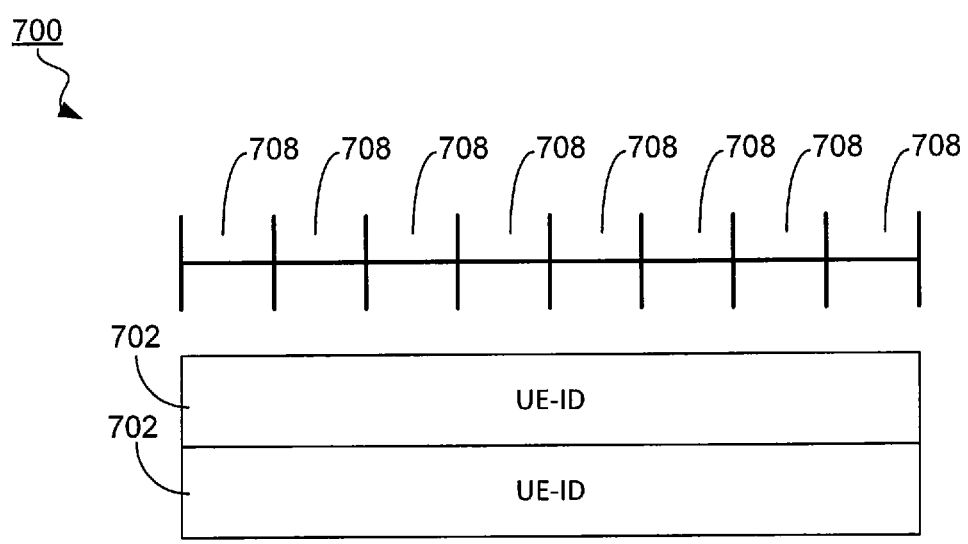
FIG. 7A illustrates an exemplary configuration of a MAC CE of a Scheduling Request (SR) message with at least one UE-ID, in accordance with some embodiments of the present disclosure.

FIG. 7A illustrates an exemplary configuration 700 of a MAC CE of a SR with at least one UE-ID, in accordance with some embodiments of the present disclosure. In the illustrated embodiments, the MAC CE of a SR comprises UE-ID 702, which occupies 16 bits 708.

Figure 7B:
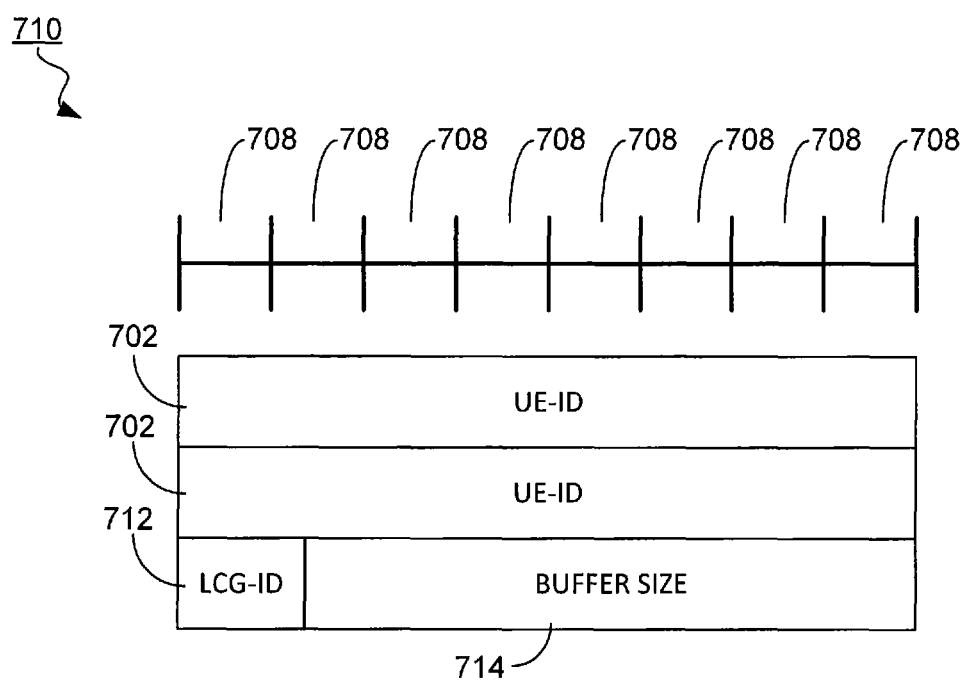
FIG. 7B illustrates an exemplary configuration of a MAC CE of a Buffered Status Reporting (BSR) message with at least one UE-ID, in accordance with some embodiments of the present disclosure.

FIG. 7B illustrates an exemplary configuration 710 of a MAC CE of a BSR with at least one UE-ID, in accordance with some embodiments of the present disclosure. In the illustrated embodiments, the MAC CE of a BSR comprises a UE-ID 702, which similar to the MAC CE of a SR, occupies 16 bits 708. In some embodiments, the MAC CE of a BSR also comprises 2-bit Logical Channel Group (LCG) ID 712 and 6-bit buffer size 714.

The method 600 continues with operation 606 in which before the expiration of the timer for SR or BSR conformation, the UE 104 receives at least one scheduling resource of a PDCCH from the BS 102 according to some embodiments. In some embodiments, the UE 104 can further perform operations according to the scheduling information of the PDCCH.

The method 600 continues with operation 604 in which when before the expiration of the timer for SR or BSR confirmation, the UE 104 does not receive the at least one scheduling resource of the PDCCH from the BS 102, the UE 104 re-transmits the second message to the BS 102 on the at least one common resource according to some embodiments. In some embodiments, the re-transmission of the second message is configured by the BS 102. In some embodiments, when a total number of actual transmission times is less than or equal to the maximum number of times to transmit the SR or BSR on the at least one common resource, the UE 104 transmits the SR or BSR on the at least one common resource until the total number of actual transmission times becomes greater than the maximum number of transmission times. When the total number of actual transmission times is greater than the maximum number of transmission times, the UE 104 can transmit a Scheduling Request (SR) or a Buffer Status Reporting (BSR) based on one of the following method: a SR or BSR transmission with the UE-ID on selected pre-configured common resources with higher enhanced coverage level, a SR transmission triggered by a contention-based PRACH process, a SR transmission triggered by a non-contention-based PRACH process, a SR together with HARQ acknowledgement, and a BSR transmission triggered by a Semi-Persistent Scheduling (SPS) for BSR. In some embodiments, when the maximum number of transmission times is not configured in the first message, the maximum number of transmission times can be a default value (e.g., 1).

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, comprising
receiving a first message from a wireless communication node, wherein the first message comprises configuration information of at least one common resource, wherein the at least one common resource comprises:
a first common resource comprising a common search space and,
a resource for uplink transmission with a first identification of the wireless communication device, wherein the resource for uplink transmission is selected from a plurality of resources based on a modulo operation, wherein the modulo operation comprises obtaining a remainder of a division of a device identification (ID) number by a number of the plurality of resources;
transmitting a second message to the wireless communication node on the at least one common resource and starting a first timer, wherein the second message comprises the first identification of the wireless communication device;
monitoring a common physical control channel corresponding to the second message; and
receiving a third message on the common physical control channel from the wireless communication node on the at least one common resource before an expiration of the first timer.

2. The method of claim 1, wherein the first message is a system information block (SIB).

3. The method of claim 1, wherein the at least one common resource each comprises one of the following: a common search space, common configuration information of a Signaling Radio Bearer (SRB), common configuration information of a Data Radio Bearer (DRB), configuration information of a Radio Link Control (RLC) layer, a common Physical Downlink Shared Channel (PDSCH), a common resource for transmitting a Scheduling Request (SR) message, and a common resource for transmitting a Buffered Status Reporting (BSR) message.

4. The method of claim 1, wherein the resource for uplink transmission with the first identification can be at least one of the following: a preamble resource, a physical uplink shared channel (PUSCH) resource, and a preamble and PUSCH resource.

5. The method of claim 3, wherein the common search space comprises configuration information for monitoring the common physical control channel, wherein the configuration information comprises at least one of the following: a monitoring starting time, a monitoring period, and a monitoring interval.

6. The method of claim 1, wherein the first identification of the wireless communication device is one of the following: a non-access stratum (NAS) identification, and a third identification for the wireless communication device configured by the wireless communication node.

7. The method of claim 1, wherein the second message further comprises at least one of the following: a NAS Protocol Data Unit (PDU), a data PDU, a first Radio Resource Control (RRC) message, a corresponding MAC Control Element (CE), a SR message, and a BSR message.

8. The method of claim 7, wherein the first RRC message comprises at least one of the following: an RRCConnectionRequest message, an RRCConnectionResumeRequest message, an RRCEarlyDataRequest message, an RRCConnectionReestablishmentRequest message, and a Data Transmission Request message.

9. The method of claim 1, wherein the third message comprises at least one of the following: a second identification of the wireless communication device and at least one first resource.

10. The method of claim 1, further comprising:
receiving a fourth message from the wireless communication node on at least one first resource, wherein information of the at least one first resource is transmitted in the third message, and wherein the fourth message comprises a second identification of the wireless communication device.

11. A method performed by a wireless communication node, comprising
transmitting a first message to a wireless communication device, wherein the first message comprises configuration information of at least one common resource, wherein the at least one common resource comprises:
a first common resource comprising a common search space and,
a resource for uplink transmission with a first identification of the wireless communication device, wherein the resource for uplink transmission is selected from a plurality of resources based on a modulo operation, wherein the modulo operation comprises obtaining a remainder of a division of a device identification (ID) number by a number of the plurality of resources;
receiving a second message from the wireless communication device on the at least one common resource, wherein the second message comprises the first identification of the wireless communication device; and
transmitting a third message on a common physical control channel to the wireless communication device on the at least one common resource before an expiration of a first timer.

12. The method of claim 11, wherein the first timer by the wireless communication device is started after the receiving.

13. The method of claim 11, wherein the first message is a system information block (SIB).

14. The method of claim 11, wherein the at least one common resource each is one of the following: a common search space, common configuration information of a Signaling Radio Bearer (SRB), common configuration information of a Data Radio Bearer (DRB), configuration information of a Radio Link Control (RLC) layer, a common Physical Downlink Shared Channel (PDSCH), a common resource for transmitting a Scheduling Request (SR) message, and a common resource for transmitting a Buffered Status Reporting (BSR) message.

15. The method of claim 11, wherein the resource for uplink transmission with the first identification can be at least one of the following: a preamble resource, a physical uplink shared channel (PUSCH) resource, and a preamble and PUSCH resource.

16. The method of claim 14, wherein the common search space comprises configuration information for monitoring the common physical control channel by the wireless communication device, wherein the configuration information comprises at least one of the following: a monitoring starting time, a monitoring period, and a monitoring interval.

17. The method of claim 11, wherein the first identification of the wireless communication device is one of the following: a non-access stratum (NAS) identification, and a third identification for the wireless communication device configured by the wireless communication node.

18. The method of claim 11, wherein the second message further comprises at least one of the following: a NAS Protocol Data Unit (PDU), a data PDU, a first Radio Resource Control (RRC) message, a corresponding MAC Control Element (CE), a SR message, and a BSR message.

19. The method of claim 18, wherein the first RRC message comprises at least one of the following: an RRCConnectionRequest message, an RRCConnectionResumeRequest message, an RRCEarlyDataRequest message, an RRCConnectionReestablishmentRequest message, and a Data Transmission Request message.

20. The method of claim 11, further comprising
transmitting a fourth message to the wireless communication device on at least one first resource, wherein information of the at least one first resource is transmitted in the third message, wherein the fourth message comprises a second identification of the wireless communication device.

* * * * *